US008990010B2

(12) United States Patent
Pfeifle et al.

(10) Patent No.: US 8,990,010 B2
(45) Date of Patent: Mar. 24, 2015

(54) SYSTEM AND METHOD FOR USING SKYLINE QUERIES TO SEARCH FOR POINTS OF INTEREST ALONG A ROUTE

(75) Inventors: Martin Pfeifle, Seewald (DE); Jonghyun Suh, Hessen (DE); Boris Gumhold, Frankfurt am Main (DE)

(73) Assignee: HERE Global B.V., Veldhoven (NL)

( * ) Notice: Subject to any disclaimer, the term of this patent is extended or adjusted under 35 U.S.C. 154(b) by 463 days.

(21) Appl. No.: 13/332,602

(22) Filed: Dec. 21, 2011

(65) Prior Publication Data

US 2013/0166586 A1 Jun. 27, 2013

(51) Int. Cl.
*G01C 21/34* (2006.01)

(52) U.S. Cl.
CPC ...................................... *G01C 21/34* (2013.01)
USPC ............ 701/426; 701/408; 701/409; 701/411

(58) Field of Classification Search
None
See application file for complete search history.

(56) References Cited

U.S. PATENT DOCUMENTS

| | | | |
|---|---|---|---|
| 5,802,492 A | 9/1998 | DeLorme et al. | |
| 5,948,040 A | 9/1999 | DeLorme et al. | |
| 6,321,158 B1 * | 11/2001 | DeLorme et al. | 701/426 |
| 6,401,034 B1 * | 6/2002 | Kaplan et al. | 701/416 |
| 6,434,482 B1 * | 8/2002 | Oshida et al. | 701/426 |
| 6,587,782 B1 | 7/2003 | Nocek et al. | |
| 6,839,628 B1 * | 1/2005 | Tu | 701/426 |
| 6,912,463 B2 * | 6/2005 | Miwa | 701/410 |
| 7,076,505 B2 | 7/2006 | Campbell | |
| 7,082,365 B2 * | 7/2006 | Sheha et al. | 701/426 |
| 7,321,826 B2 * | 1/2008 | Sheha et al. | 701/426 |
| 7,496,444 B1 * | 2/2009 | Fried | 701/426 |
| 7,640,104 B2 * | 12/2009 | Ramaswamy et al. | 701/423 |
| 7,890,254 B2 * | 2/2011 | Arnold-Huyser et al. | 701/426 |
| 8,239,130 B1 * | 8/2012 | Upstill et al. | 701/426 |
| 8,401,786 B2 * | 3/2013 | Poppen et al. | 701/468 |
| 8,423,291 B2 * | 4/2013 | Geelen | 701/426 |
| 8,510,045 B2 * | 8/2013 | Rueben et al. | 701/532 |

(Continued)

FOREIGN PATENT DOCUMENTS

| | | |
|---|---|---|
| EP | 1203931 | 5/2002 |
| EP | 1698860 | 9/2006 |

(Continued)

OTHER PUBLICATIONS

Kodama, Kazuki, Skyline Queries Based on User Locations and Preferences for Making Location-Based Recommendations, Graduate School of Information Science, Nagoya University, 2009.*

(Continued)

*Primary Examiner* — Thomas Tarcza
*Assistant Examiner* — Richard Goldman
(74) *Attorney, Agent, or Firm* — Lempia Summerfield Katz LLC

(57) ABSTRACT

A method and system for searching for points of interest along a route is disclosed. A relation that includes records that associate link identifiers, point of interest identifiers, and distances between the links and the points of interest is generated during the compilation process of a first version of a geographic database. The relation is stored in compiled database products. When a compiled database product is being used by a navigation system, for example, navigation application software programs use the relation to accurately and efficiently find points of interest along a computed route. Navigation systems can also use the relation to service skyline queries and responsively generate skyline graphs of points of interest.

20 Claims, 13 Drawing Sheets

(56) References Cited

U.S. PATENT DOCUMENTS

| | | | |
|---|---|---|---|
| 8,560,227 B2 * | 10/2013 | Feng | 701/426 |
| 8,566,030 B1 * | 10/2013 | Demiryurek et al. | 701/426 |
| 8,571,787 B2 * | 10/2013 | Jendbro | 701/400 |
| 2002/0038180 A1 | 3/2002 | Bellesfield et al. | |
| 2002/0181393 A1 * | 12/2002 | Grover et al. | 370/225 |
| 2003/0195700 A1 | 10/2003 | Hamada et al. | |
| 2004/0008225 A1 | 1/2004 | Campbell | |
| 2004/0260465 A1 * | 12/2004 | Tu | 701/209 |
| 2006/0089788 A1 * | 4/2006 | Laverty | 701/202 |
| 2006/0200304 A1 * | 9/2006 | Oh | 701/200 |
| 2006/0241857 A1 * | 10/2006 | Onishi et al. | 701/202 |
| 2007/0198439 A1 * | 8/2007 | Shriraghav et al. | 705/400 |
| 2010/0027527 A1 * | 2/2010 | Higgins et al. | 370/351 |
| 2010/0042318 A1 * | 2/2010 | Kaplan et al. | 701/204 |
| 2010/0057357 A1 | 3/2010 | Miyata et al. | |
| 2010/0064254 A1 * | 3/2010 | Atsmon et al. | 715/810 |
| 2010/0217525 A1 * | 8/2010 | King et al. | 701/300 |
| 2010/0268449 A1 * | 10/2010 | Feng | 701/201 |
| 2010/0299065 A1 | 11/2010 | Mays | |
| 2011/0066657 A1 | 3/2011 | Weiland et al. | |
| 2011/0084969 A1 * | 4/2011 | Park et al. | 345/443 |
| 2011/0106429 A1 * | 5/2011 | Poppen et al. | 701/201 |
| 2012/0041673 A1 * | 2/2012 | Vandivier et al. | 701/426 |
| 2012/0123678 A1 * | 5/2012 | Poppen et al. | 701/468 |
| 2012/0143491 A1 * | 6/2012 | Cheng | 701/410 |
| 2012/0158289 A1 * | 6/2012 | Bernheim Brush et al. | 701/425 |
| 2012/0197713 A1 | 8/2012 | Stroila et al. | |
| 2013/0035852 A1 * | 2/2013 | Vandivier et al. | 701/426 |
| 2013/0046467 A1 * | 2/2013 | Iwane et al. | 701/540 |
| 2013/0166192 A1 * | 6/2013 | Pfeifle et al. | 701/410 |
| 2013/0166586 A1 * | 6/2013 | Pfeifle et al. | 707/769 |
| 2013/0261957 A1 * | 10/2013 | Mahapatro et al. | 701/426 |

FOREIGN PATENT DOCUMENTS

| | | |
|---|---|---|
| EP | 2075540 | 7/2009 |
| JP | 2011221817 | 4/2011 |

OTHER PUBLICATIONS

International Search Report and Written Opinion for related application No. PCT/EP2012/074877, mailed Apr. 2, 2013.

Internatonal Search Report and Written Opinion received in related PCT Application No. PCT/EP2012/075042, Mailed Apr. 8, 2013.

* cited by examiner

SKYLINE POINTS
DEVIATION ONLY 864

| POI | Dev | $/unit |
|-----|-----|--------|
| E | 0.1 | 3.08 |
| H | 0.5 | 3.00 |
| C | 1 | 2.98 |
| D | 1.5 | 2.95 |

1100

1110
Determine a current position at a navigation system

1120
Receive a request for a skyline query at the navigation system, where the skyline query is related to one or more point-of-interest attributes

1130
In response to the request, the navigation system:
(a) Determine a plurality of points of interest associated with the current position using a relation configured to store at least:
- an identifier associated with a link related to the current position,
- an identifier associated with a point of interest,
- a distance between the link related to the current position and the point of interest, and
- a value for each attribute of the one or more point-of-interest attributes

1140
(b) Select one or more skyline points of interest from the plurality of points of interest associated with the link related to the current position, where each skyline point of interest is not dominated by other points of interest in the plurality of points of interest with respect to the one or more point-of-interest attributes, and

1150
(c) Produce an indication of the one or more skyline points of interest.

FIG. 11

SYSTEM AND METHOD FOR USING SKYLINE QUERIES TO SEARCH FOR POINTS OF INTEREST ALONG A ROUTE

REFERENCE TO RELATED APPLICATIONS

The present patent application is related to patent application Ser. No. 13/332,608, now U.S. Pat. No. 8,620,577 entitled "SYSTEM AND METHOD FOR SEARCHING FOR POINTS OF INTEREST ALONG A ROUTE," filed on the same date.

FIELD

The present invention relates generally to routing, and more particularly, relates to generating skyline queries to search for points of interest along a route.

BACKGROUND

Navigation systems are available that provide end users (such as drivers and passengers of the vehicles in which the in-vehicle navigation systems are installed) with various navigation-related functions and features. For example, some navigation systems are able to determine an optimum route to travel by roads between locations in a geographic region. Using input from the end user, and optionally from equipment that can determine one's physical location (such as a GPS system), a navigation system can examine various routes between two locations to determine an optimum route to travel from a starting location to a destination location in a geographic region.

The navigation system may then provide the end user with information about the optimum route in the form of guidance that identifies the driving maneuvers required to be taken by the end user to travel from the starting location to the destination location. The guidance may take the form of visual and/or audio instructions that are provided along the way as the end user is traveling the route. Some navigation systems are able to show detailed maps on computer displays outlining routes to destinations, the types of maneuvers to be taken at various locations along the routes, locations of certain types of features, and so on.

Some navigation systems can also search for points of interest (POIs) along a computed route. POIs are locations that may be of interest to a user of a navigation system. For example, POIs include hotels, restaurants, museums, stadiums, airports, hospitals, parks, and so on.

The navigation system may perform a spatial search to generate a list of POIs along the route. The spatial search finds all POIs that are within a certain Euclidean distance from any link of the calculated route. While a spatial search is efficient, it is inaccurate because it does not consider topology.

To overcome the problems associated with a spatial search, the navigation system may use topological relationships to obtain a more exact list of POIs along the route. For example, the navigation system could use the Dijkstra algorithm for each link in the route and report all POIs that are found while exploring the neighborhood of the links. The Dijkstra algorithm stops either after a certain amount of POIs have been reported or after exploring all links within a distance from any link of the route. While this approach is more accurate, it is much more time consuming and difficult to implement.

In order to provide these and other navigating functions, navigation systems use geographic data. The geographic data may be in the form of one or more databases that include data that represent physical features in a geographic region. The geographic database may include data representing the roads and intersections in a geographic region and also may include information relating to the represented roads and intersections in the geographic region, such as turn restrictions at intersections, speed limits along the roads, street names of the various roads, address ranges along the roads, and so on.

SUMMARY

A method and system for searching for a point of interest along a route is disclosed. A compiler generates a relation that associates link identifiers, point of interest identifiers, and distances between the links and the points of interest. The compiler starts the process of generating the relation by selecting either a link or a point of interest from a first version of a geographic database, which may be a master version of the geographic database or an intermediate delivery version derived therefrom. After selecting a link, the compiler identifies the points of interest within a distance from the link using a routing algorithm. For each identified point of interest, the compiler adds a record into the relation that includes the link's identifier, the point of interest's identifier, and the distance between the link and the point of interest. Alternatively, the compiler selects a point of interest and identifies the links within a distance from the point of interest using a reverse routing algorithm. In either scenario, the compiler repeats the process until all (or a portion) of the links or points of interest have been selected.

The relation is stored in a compiled database product, such as a geographic database used on a navigation system platform (e.g., in-vehicle navigation system, personal navigation device, mobile telephone, server with mapping application). As a result of the relation being stored in the geographic database, the navigation system can accurately find points of interest along a calculated route or a current location efficiently.

Additionally, a computer-implemented method for determining skyline points of interest is disclosed. A navigation system determines a route path. The route path includes one or more links. The navigation system receives a request for a skyline query, wherein the skyline query is related to one or more point-of-interest attributes. In response to the request, the navigation system: (a) determines a plurality of points of interest associated with the one or more links of the route path using a relation configured to store at least an identifier associated with a link, an identifier associated with a point of interest, a distance between the link and the point of interest, and a value for each attribute of the one or more point-of-interest attributes, (b) selects one or more skyline points of interest from the plurality of points of interest associated with the link, where each skyline point of interest is not dominated by other points of interest in the plurality of points of interest with respect to the one or more point-of-interest attributes, and (c) produces an indication of the one or more skyline points of interest.

Also, a computer-implemented method for determining skyline points of interest is disclosed. A navigation system determines a current position. The route path includes one or more links. The navigation system receives a request for a skyline query, wherein the skyline query is related to one or more point-of-interest attributes. In response to the request, the navigation system: (a) determines a plurality of points of interest associated with the current position using a relation configured to store at least an identifier associated with a link related to the current position, an identifier associated with a point of interest, a distance between the link related to the current position and the point of interest, and a value for each attribute of the one or more point-of-interest attributes, (b) selects one or more skyline points of interest from the plurality of points of interest associated with the link related to the current position, where each skyline point of interest is not dominated by other points of interest in the plurality of points of interest with respect to the one or more point-of-interest attributes, and (c) produces an indication of the one or more skyline points of interest.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein:

FIG. 11 is a flow diagram of a method for performing skyline queries, according to an example.

DETAILED DESCRIPTION

Figure 1:
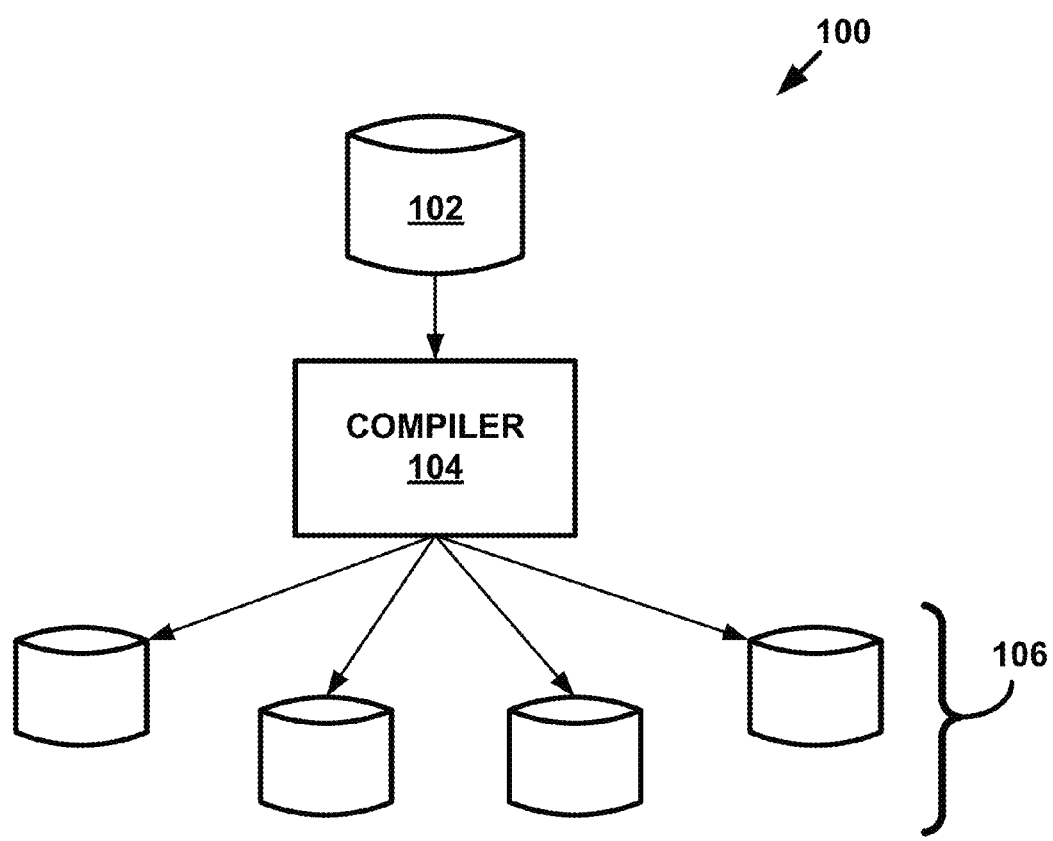
FIG. 1 is a block diagram that illustrates forming geographic database products from a first version of a geographic database, according to an example.

FIG. 1 depicts a system 100 for generating geographic database products. The system 100 includes a master version of a geographic database 102. The master version of the geographic database 102 contains data that represent geographic features in a coverage area. The coverage area may correspond to an entire country, such as the United States. Alternatively, the coverage area may correspond to several countries, such as the United States, Canada, and Mexico, or France, Germany, and Italy, and so on. According to another alternative, the coverage area of the master version of the geographic database 102 may represent only a single region within a country, such as the West Coast or the Midwest of the U.S. Although the master version of the geographic database 102 includes data that represent geographic features in the entire coverage area, there may be parts of the coverage area that contain geographic features that are not represented by data in the geographic database, or for which the representation of geographic features is sparse.

The master version of the geographic database 102 includes data about a road network located in the coverage area. The data about the road network include various kinds of information, such as the geographic coordinates of positions of the roads, street names of the roads, addresses ranges along the roads, turn restrictions at intersections of roads, and so on.

The master version of the geographic database 102 also includes data about points of interest in the covered area. Points of interest may include hotels, restaurants, museums, stadiums, offices, automobile dealerships, auto repair shops, etc. The master version of the geographic database 102 may include data about the locations of these points of interest. The master version of the geographic database 102 may also include data about places, such as cities, towns, or other communities, and other kinds of information.

The master version of the geographic database 102 is maintained as the copy that has the most up-to-date data relating to the coverage area. Accordingly, the master version of the geographic database 102 is updated, expanded, and/or otherwise modified on a regular and continuing basis. To facilitate these operations, the master version of the geographic database 102 is stored in a format that facilitates updating, maintenance, and development. For example, the data in the master version 102 may be uncompressed. Examples of suitable formats include Oracle Spatial and VSAM although other formats, both proprietary and non-proprietary, including GDF, may be suitable. In general, the format of the master database 102 is not suitable for use in navigation systems.

The master version of the geographic database 102 is used to make compiled database products 106. In one method of operation, data from the master version of the geographic database 102 is first compiled into an intermediate or delivery format, such as GDF. Then, the database in the intermediate or delivery format is used to make the compiled database products 106. The compiled database products 106 are made using a compiler 104. The compiler 104 is a software program run on an appropriate computer platform. The compiler 104 obtains geographic data from the intermediate format database (which was formed from the master geographic database 102) and organizes the data into a format (or formats) to produce the compiled (or working) version of the geographic databases 106. The format of the compiled geographic database products 106 facilitates use of the geographic data in the end users' systems for navigation-related purposes.

The compiled database products 106 may include only portions of all the data in the master version of the geographic database 102. For example, the compiled database products 106 may include data that relate to only one or more specific sub-areas within the coverage area of the master version of the geographic database 102. Further, the compiled database products 106 may include fewer than all the data attributes that describe geographic features represented in the master version of the geographic database 102.

The compiled database products 106 are used on various kinds of computing platforms. For example, the compiled database products 106 are used in navigation systems (such as in-vehicle navigation systems and hand-held portable navigation systems), personal computers (including desktop and notebook computers), and other kinds of devices, such as tablets, mobile telephones, personal digital assistants, and so on. The compiled database products 106 are also used on networked computing platforms and environments, including systems connected to the Internet.

The compiled database products 106 are stored on media that are suitable for the hardware platforms on which they are used. For example, the compiled database products 106 may be stored on CD-ROM disks, hard drives, DVD disks, flash memory, or other types of media that are available now or that become available in the future.

In the compiled database products 106, the geographic data are organized differently than in the master or intermediate versions of the geographic database. A compiled database is organized, arranged, structured and stored in a form that facilitates the use of the data in the computing platform in which it is installed. A compiled database product 106 may also be stored in a compressed format on the media on which it is located.

To facilitate the search of POIs along a route, a new data attribute is stored in the compiled databases 106. This new attribute, referred to as "distance," is generated by the compiler 104 using data stored in the master or intermediate versions of the geographic database. The distance attribute is the distance between a link and a point of interest. A link represents a portion of a road. A point of interest is a location that a person may be interested in traveling to.

Also during compilation, the compiler 104 creates a relation that contains all links within a "reasonable distance" from a point of interest. The relation may be represented as Link2POI (LinkID, POIID, Distance), where "Distance" is the distance attribute. The reasonable distance value is provided as an input to the compiler 104. The value of the reasonable distance may be the expected maximum query distance. For example, the reasonable distance may be three kilometers.

The Link2POI relation facilitates different types of POI searches. For example, if a navigation system has calculated a route, the navigation system can use the relation to identify all points of interest that are located along any link in the route. As another example, if a point of interest is selected during destination selection, the navigation system can use the relation to find all access links that serve as a destination for the routing algorithm.

Another type of POI search is a "skyline query." As an example, suppose a person is interested in going to a popular waterfront city. The person wants to find a hotel that is both cheap and close to the waterfront. A skyline query for hotels in this situation would be a query searching for the "skyline" or set of all hotels that are not worse than any other hotel in low price and in distance from the waterfront. Then, the person can look through the hotels in the skyline to determine the best hotel for their needs.

More formally, the skyline is a list of points in N dimensions that are not dominated by any other point in all N dimensions. A point DP dominates another point P if DP is better than P in all dimensions. Continuing the hotel example, the closest hotel to the waterfront among all hotels being searched is the best hotel in terms of distance to the waterfront and, therefore, a point representing the closest hotel cannot be dominated by any other point. Similarly, the cheapest hotel among all hotels being searched is the best hotel in terms of price and, therefore, a point representing the cheapest hotel cannot be dominated by any other point.

Figure 2:
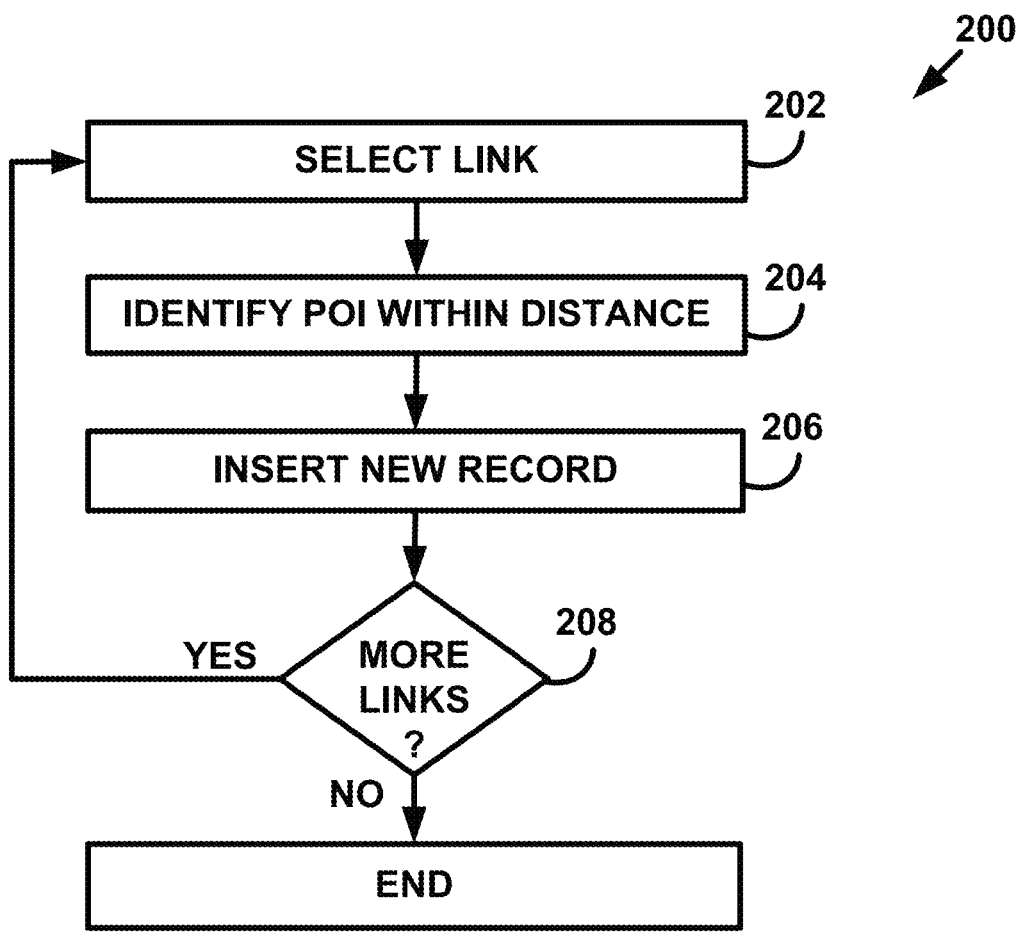
FIG. 2 is a flow diagram that illustrates a compilation process using the compiler depicted in FIG. 1, according to an example.
Figure 3:
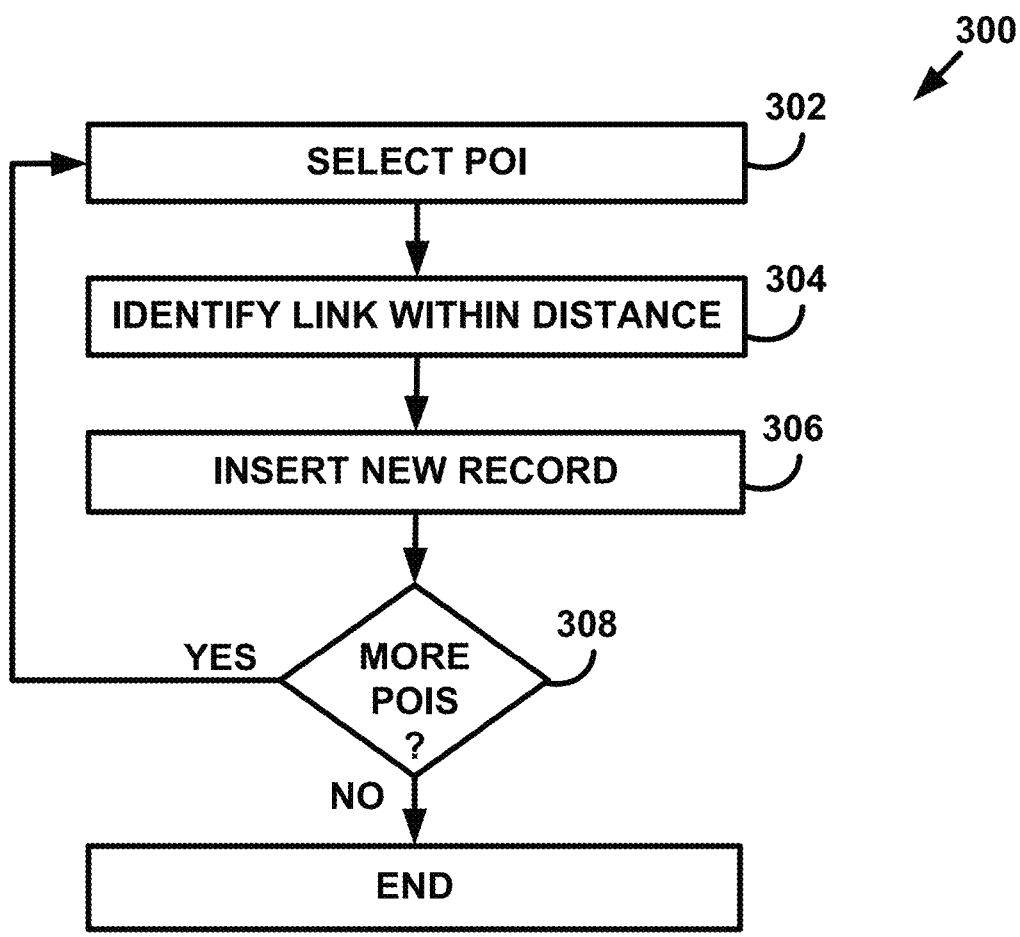
FIG. 3 is a flow diagram that illustrates a compilation process using the compiler depicted in FIG. 1, according to another example.

The distance attribute and relation may be created using a routing algorithm as described with respect to FIG. 2 or using a reverse routing algorithm as described with respect to FIG. 3.

FIG. 2 depicts a flowchart of a compilation process 200 that may be performed by the compiler 104. At block 202, the compiler 104 selects a link represented in a first version of the database, which may be the master version of the database 102 or an intermediate version derived therefrom. Using a routing algorithm, such as the Dijkstra algorithm, the compiler 104 identifies all points of interest located within the reasonable distance value of the link at block 204. At block 206, for all identified POIs, the compiler 104 inserts a new record into the Link2POI relation. The record includes an identifier associated with the link, an identifier associated with the point of interest, and the distance between the link and the point of interest.

For example, at block 202, the compiler 104 selects a link having the link identifier (LinkID) of 4711. At block 204, the compiler 104 uses a reasonable distance value of two kilometers to identify points of interest. Using a search algorithm, the compiler 104 identifies the points of interest having POI identifiers (POIID) 777 and 987. POI 777 is 0.650 km from link 4711, while POI 987 is 1.450 km from link 4711. At block 206, the compiler 104 inserts the records as depicted in Table 1.

TABLE 1

| Link2POI | | |
|---|---|---|
| LinkID | POIID | Distance |
| 4711 | 777 | 0.650 |
| 4711 | 987 | 1.450 |

At block 208, the compiler 104 determines whether there are more links in the first version of the geographic database that need to be searched. If there are more links, the compiler 104 returns to block 202. Otherwise, the compilation process ends.

FIG. 3 depicts a flowchart of another compilation process 300 that may be performed by the compiler 104. In this process 300, the Link2POI relation is created by using a reverse routing algorithm. The reverse routing algorithm starts the search from a point of interest and identifies all links within the reasonable distance. For example, a modified Dijkstra routing algorithm may be used during the compilation process 300.

At block 302, the compiler 104 selects a POI represented in the first version of the database, which may be the master version of the database 102 or the intermediate version derived therefrom. At block 304, the compiler 104 identifies all links located within the reasonable distance value of the POI. At block 306, for all identified links, the compiler 104 inserts a new record into the Link2POI relation. At block 308, the compiler 104 determines whether there are more POIs in the first version of the geographic database that need to be searched. If there are more POIs, the compiler 104 returns to block 302. Otherwise, the compilation process ends.

At the completion of compilation, the Link2POI relation is the same regardless of whether the compiler 104 runs the compilation process 200 or the compilation process 300. Depending on the number of links and POIs represented in the first version of the geographic database, the Link2POI relation can become quite large.

Binary Large Objects (BLOBs) may be used to reduce the size of the Link2POI relation. A BLOB is a collection of binary data stored as a single entity in a database management system. In one example, the compiler 104 stores the information contained in the Link2POI relation in a relation Link2BlobPOI(LinkID, BLOBPOI), where BLOBPOI contains all POIs that are accessible from the link of this row within the reasonable distance. The BLOB may be encoded using a compressed binary encoding, e.g., delta encoding of POI IDs and/or delta encoding of the distance values. Additionally or alternatively, the compiler 104 may store the information contained in the Link2BLOBPOI relation using binary-compressed BLOBPOI columns, for example, by using zlib.

In order to access the relation Link2BlobPOI(LinkID, BLOBPOI) conveniently, the compiler 104 may generate a virtual table v_Link2POI(LinkID, POIID, Distance) on the basis of the table Link2BlobPOI(LinkID, BLOBPOI). The system querying the v_Link2POI virtual table does so in a similar manner as described with respect to querying the relation Link2POI, for example, using SQL. When accessing the relation $v_{Link}2POI$, the virtual table reads from the table Link2BlobPOI the column BlobPOI and then provides the POIs and their distances through the table v_Link2POI to the system performing the query.

Besides the smaller database size, the use of the BLOBs has another advantage. As the table Link2BLOBPOI contains fewer entries than the table Link2POI, there are also fewer entries stored in the B-tree, which is used for indexing the LinkID values in the tables Link2POI and Link2BLOBPOI. The less entries to be indexed, the better for the SQL_Querying performance (done by the navigation system) and the inserting performance (done by the compiler).

Note that instead of storing the binary encoded POIs and distances in a BLOB column of a relation, they may also be stored directly as a flexible attribute of the link, which is used in the navigation database standard (NDS). Link attributes are described with respect to FIG. 4.

Another way of reducing the size of the Link2POI relation is to vary the reasonable distance value based on the type of road represented by a link. There are more points of interest in a city than in a rural area. Thus, using a smaller reasonable distance value, when compiling city streets, reduces the size of the relation. For example, the reasonable distance value may be one kilometer when compiling city streets and three kilometers when compiling highways. As another example, the reasonable distance value may be proportional to the inverse of POI density.

Still another way for reducing the size of the Link2POI relation is to create another relation Link2Link. When there are multiple points of interest within a reasonable distance from a link, a separate record is generated in the Link2POI relation for each POI. Instead of storing a separate record for each POI, the compiler 104 installs a single record in the Link2Link relation having the format: Link2Link(Link_From, Link_To, Distance) and another record in the relation AccessLink4POIs(LinkID, POIID). The AccessLink4POIs relation is typically already available in a geographic database to identify the set of links from which a POI can be directly accessed. Now, the Link2POI relation can be used in a view command as follows.

```
CREATE VIEW Link2POI AS
SELECT l.Link_From as LinkID, p.POIID, l.Distance FROM Link2Link
l, AccessLink4POIs p where l.Link_To=p.LinkID.
```

Figure 4:
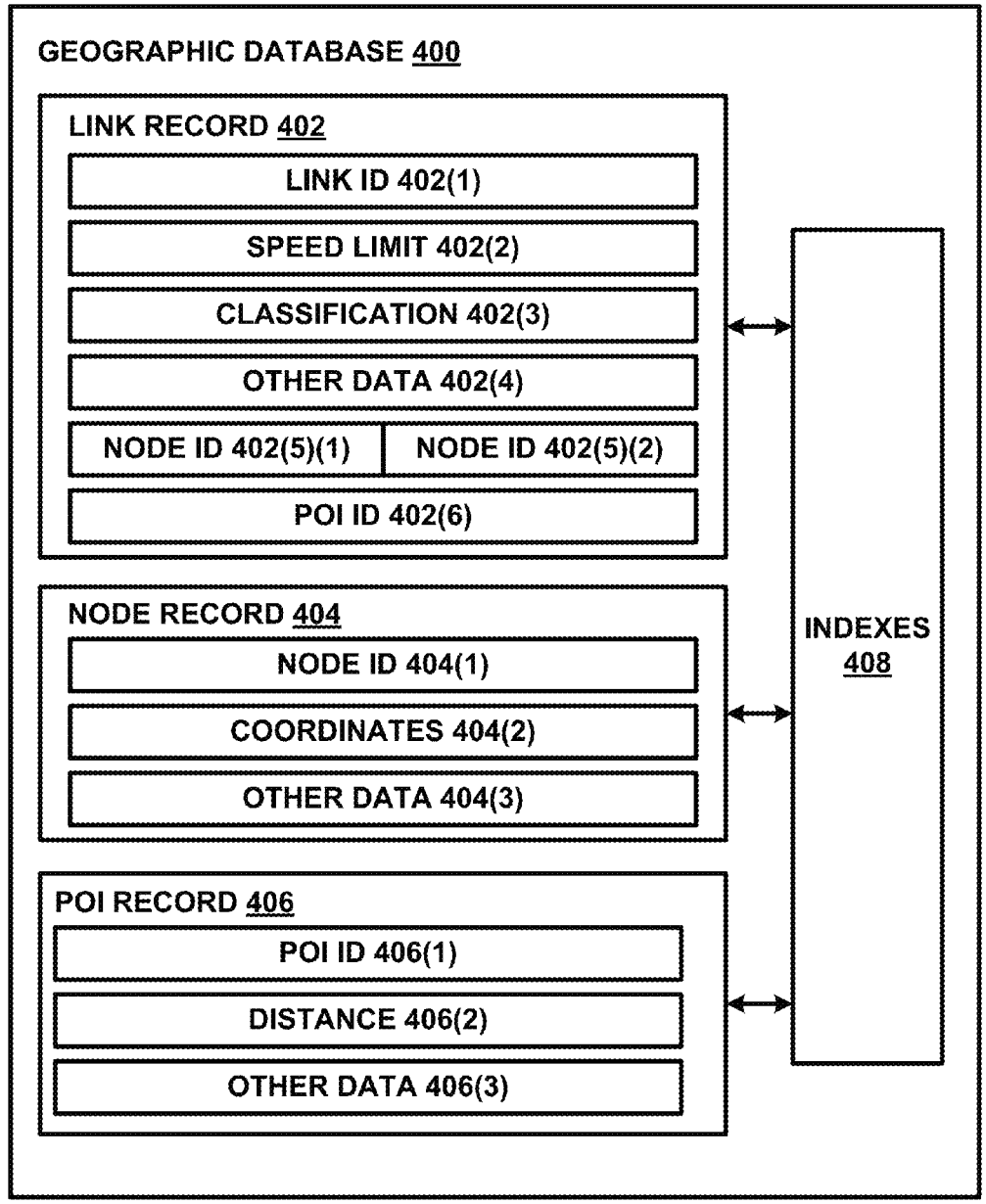
FIG. 4 is a block diagram of a geographic database product; according to an example.

FIG. 4 depicts a geographic database 400. The geographic database 400 contains information about a roadway network in the geographic region. In one example, the geographic database 400 includes node data and link data. These data represent components of the physical road network. The node data represent physical locations in the geographic region (such as roadway intersections and other positions) and the link data represent portions of roadways between the physical locations represented by nodes. (The terms "nodes" and "links" represent only one terminology for describing these physical geographic features and other terminology for describing these features is intended to be encompassed within the scope of these concepts.)

The geographic database 400 is an example compiled database product produced by the compiler 104 using one of the compilation processes 200, 300. The geographic database 400 contains at least one database record 402 (also referred to as "entity" or "entry") for each link (also referred to as "segment") in a geographic region. The link data record 402 includes a link ID 402(1) by which the data record can be identified in the geographic database 400.

Each link data record 402 has associated with it information (such as "attributes", "fields", etc.) that describes features of the represented road segment. For example, the link data record 402 includes a speed limit attribute 402(2) that includes data indicating a speed limit or speed category (i.e., the maximum permitted vehicular speed of travel) on the represented road link. As another example, the link data record 402 includes a classification attribute 402(3) that includes data indicating whether the represented road link is part of a controlled access road (such as an expressway), an arterial road, or a local road. As there may be many other attributes associated with a link, FIG. 4 depicts an other data attribute 402(4).

Each road link is associated with two nodes. One node represents the point at one end of the road link and the other node represents the point at the other end of the road link. The node at either end of a road link may correspond to a location at which the road meets another road, i.e., an intersection, or where the road dead-ends. Accordingly, the link data record 402 also includes a first node ID 402(5)(1) for the first end of the link and a second node ID 402(5)(1) for the second end of the link. The first node ID 402(5)(1) and the second node ID 402(5)(2) are also located in a node record 404.

As described, the node record 404 includes a node ID 404(1) by which the data record can be identified in the geographic database 400. The node record 404 also includes the geographic coordinates (e.g., the latitude and longitude) 404(2) of the node. As there may be many other attributes associated with a node, FIG. 4 depicts an other data attribute 404(3).

Each road link may also be associated with one or more points of interest. Accordingly, the link data record 402 also includes a point of interest ID 402(6) for each point of interest associated with the link. The point of interest ID 402(6) is also located in a POI record 406.

The POI record 406 includes a POI ID 406(1) by which the data record can be identified in the geographic database 400. The POI record 406 also includes the distance 406(2) determined during the compilation process 200, 300. The POI record 406 may also include attributes for the type or category of a point of interest (e.g., restaurant, hotel, city hall, police station, historical marker, ATM, golf course, etc.), the location of the point of interest, a phone number, hours of operation, web page, and so on. As there may be many other attributes associated with a point of interest, FIG. 4 depicts another data attribute 406(3).

The geographic database 400 also includes indexes 408. The indexes 408 provide cross references, search trees, and/or other data finding techniques. The indexes 408 include the Link2POI relation and variations described herein. One variation to the Link2POI relation is adding additional columns.

For example, the column Category may be added to the relation to support queries such as "Give me all POIs along the route for a certain category." In this example, the Link2POI relation has the format Link2POI(LinkID, POIID, Category, Distance). This example also works with the BLOB approach with the Link2BLOBPOI relation having the format Link2BLOBPOI(LinkID, Category, BLOBPOI).

As another example, the column Time may be added to the relation to support queries such as "Give me all POIs that can be reached in five minutes." Data in the Time column is the time to travel from link having the LinkID to the POI having the POIID. In some systems, the Time column may replace the Distance column in the Link2POI relation. This example also works with the BLOB approach as the relation Link2BLOBPOI(LinkID, BLOBPOI), where the BLOBPOI column contains the time necessary to reach a POI from a certain link.

Figure 5:
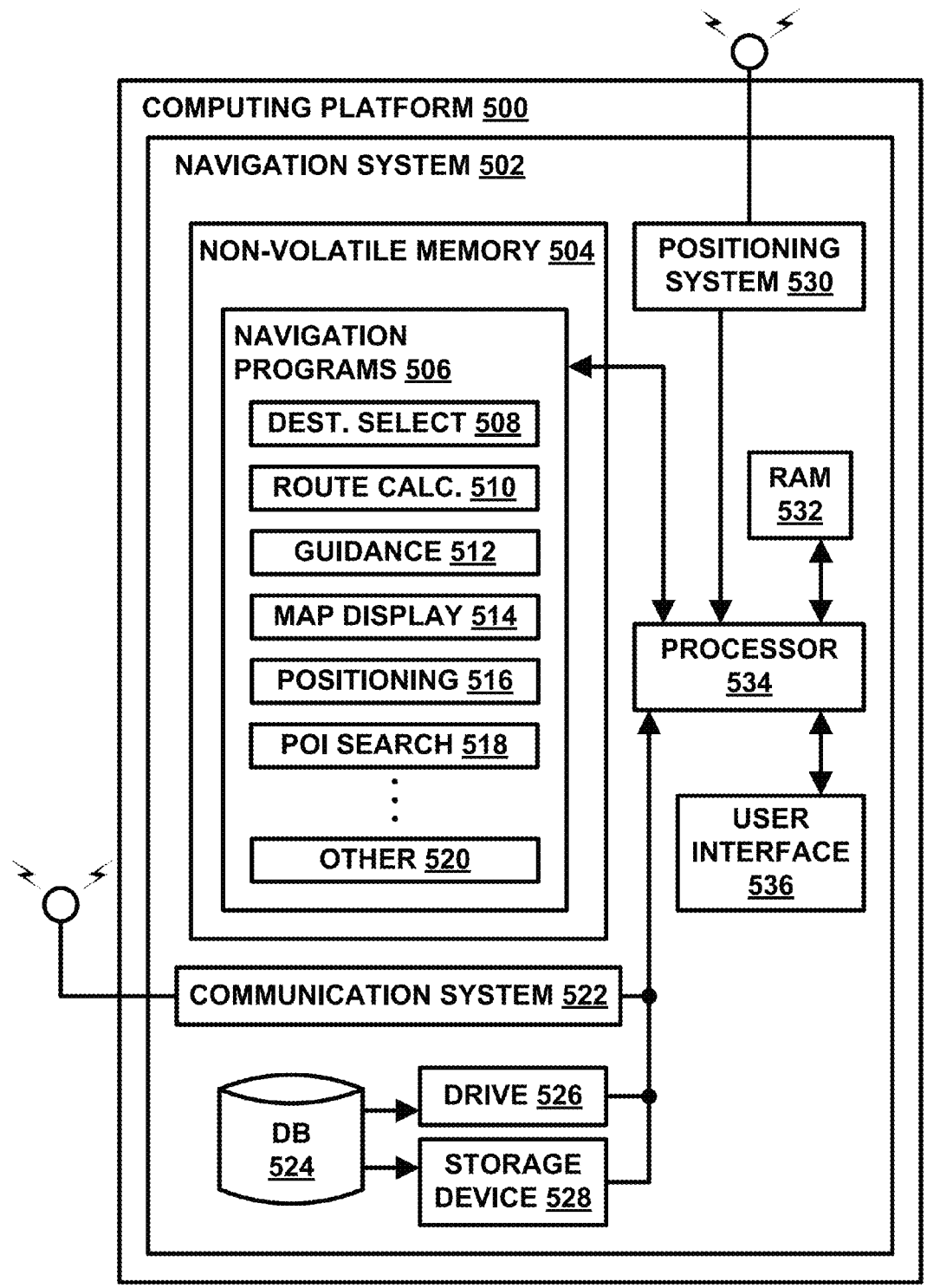
FIG. 5 is a block diagram of a navigation system, according to an example.

FIG. 5 is a block diagram of a navigation system 502 associated with a computing platform 500. The computing platform 500 may be associated with a vehicle. Additionally, the computing platform 500 may be a tablet, mobile telephone, personal computer, or any other computer. The navigation system 502 is a combination of hardware and software components. In one example, the navigation system 502 includes a processor 534, a drive 526 connected to the processor 534, and a non-volatile memory storage device 504 for storing navigation application software programs 506 and possibly other information.

The navigation system 502 also includes a positioning system 530. The positioning system 530 may utilize GPS-type technology, a dead reckoning-type system, or combinations of these or other systems, all of which are known in the art. The positioning system 530 may include suitable sensing devices that measure the traveling distance speed, direction, orientation, and so on. The positioning system 530 may also include a GPS system. The positioning system 530 outputs a signal to the processor 534. The navigation application software programs 506 that run on the processor 534 use the signal from the positioning system 530 to determine the location, direction, orientation, etc., of the computing platform 500.

The navigation system 502 also includes a user interface 536 that allows the end user to input information into the navigation system 502 and obtain information from the navigation system 502. The input information may include a request for navigation features and functions of the navigation system 502. To provide navigation features and functions, the navigation system 502 uses a geographic database 524. One example of a geographic database 524 is the geographic database 400 depicted in FIG. 4.

In one example, the geographic database 524 is stored on a storage medium, such as a CD-ROM or DVD, that is installed in the drive 526 so that the geographic database 524 can be read and used by the navigation system 502. In one example, the navigation system 502 also includes a storage device 528, such as a hard disk or memory card, on which a portion of the geographic database 524 is stored. In one example, the geographic database 524 may be a geographic database published by NAVTEQ North America, LLC of Chicago, Ill. The geographic database 524 does not have to be physically provided at the location of the navigation system 502. In alternative examples, some or the entire geographic database 524 may be located remotely from the rest of the navigation system 502 and portions of the geographic data provided via a communications system 522, as needed.

In one exemplary type of system, the navigation application software programs 506 load from the non-volatile memory storage device 504 into a random access memory (RAM) 532 associated with the processor 534. The processor 534 also receives input from the user interface 536. The navigation system 502 uses the geographic database 524 stored on the storage medium and/or storage device 528, possibly in conjunction with the outputs from the positioning system 530 and the communications system 522, to provide various navigation features and functions. The navigation application software programs 506 may include separate applications (or subprograms) that provide the various navigation-related features and functions. The navigation functions and features may include destination selection 508 (identifying one or more places to be used as a destination based on user input), route calculation 510 (determining a route from an origin to a destination), route guidance 512 (providing detailed directions for reaching a destination), map display 514, and positioning 516 (e.g., map matching). The navigation application software programs 506 also include a point of interest search application 518, which is described with reference to FIG. 6. Other functions and programming 520 may be included in the navigation system 502.

The navigation application software programs 506 may be written in a suitable computer programming language such as C++ or Java, although other programming languages are also suitable. All of the components described above may be conventional (or other than conventional) and the manufacture and use of these components are known to those of skill in the art.

Figure 6:
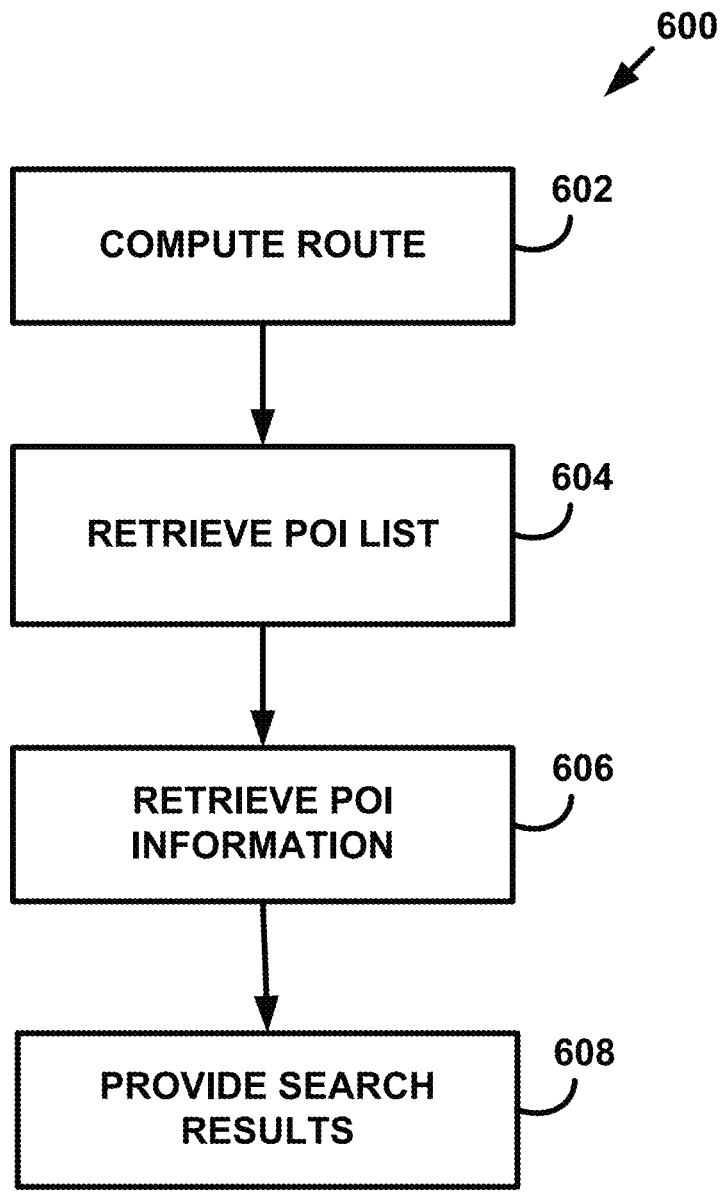
FIG. 6 is a flow diagram of a method of searching for points of interest, according to an example.

FIG. 6 is flow chart of a method 600 for searching for points of interest. A user of the navigation system 502 enters a starting location and a destination into the user interface 536. Alternatively, the navigation system 502 uses its current position based on the position detected by the positioning system 530 as the starting point.

At block 602, the route calculation program 510 calculates a route from the starting point to the destination. The route calculation program 510 may use any suitable routing algorithm, such as the Dijkstra algorithm or the A* algorithm. The calculated route is represented by a sequence of links.

At block 604, the POI search program 518 retrieves a list of POI identifiers for POIs located within a reasonable distance from the route. The POI search program 518 queries the relation Link2POI using the route as a query object to retrieve the list of POI identifiers. Using SQL as a non-limiting example, the POI search program 518 may use the following query to obtain the POI list.

SELECT POIID FROM Link2POI where LinkID in (SELECT LinkID FROM routepath) and Distance <= Dist_Query.

In this query, Dist_Query is a distance that may be provided by the user. Additionally or alternatively, the POI search program 518 may have a default distance that is used when the user does not specify a distance to be used in the search.

At block 606, the POI search program 518 retrieves information regarding the POIs identified in the POI list obtained at block 604. For example, the POI search program 518 may obtain location, category, or name from the point of interest record 406 associated with the POI identifier.

At block 608, the navigation system 502 provides search results to the user. For example, the route guidance program 512 may provide audible guidance that a particular POI is located at a distance from the user's current position on the route. As another example, the map display application 514 may present the POIs on a map display along with the user's current position.

The relation Link2POI also supports queries like "Order all POIs relative to the distance of the current car position" or "Find all POIs reachable within Dist_Query from the current car position." After the positioning application 516 locates the link associated with the navigation system's current position ((CP), i.e. LinkCP), the POI search program 518 may perform the following queries.

```
SELECT POIID, Distance FROM Link2POI where LinkID = LinkCP
order by distance
``` or

```
SELECT POIID, Distance FROM Link2POI where LinkID = LinkCP and
Distance <= Dist_Query.
```

By generating and storing the relation Link2POI(LinkID, POIID, Distance) (and any alternatives described herein) in a geographic database prior to use, a navigation system (or other system using the database) can accurately identify points of interest along a route more efficiently. A skyline query retrieves relevant points of interest, which is further described with reference to FIGS. 7-11.

Figure 7:
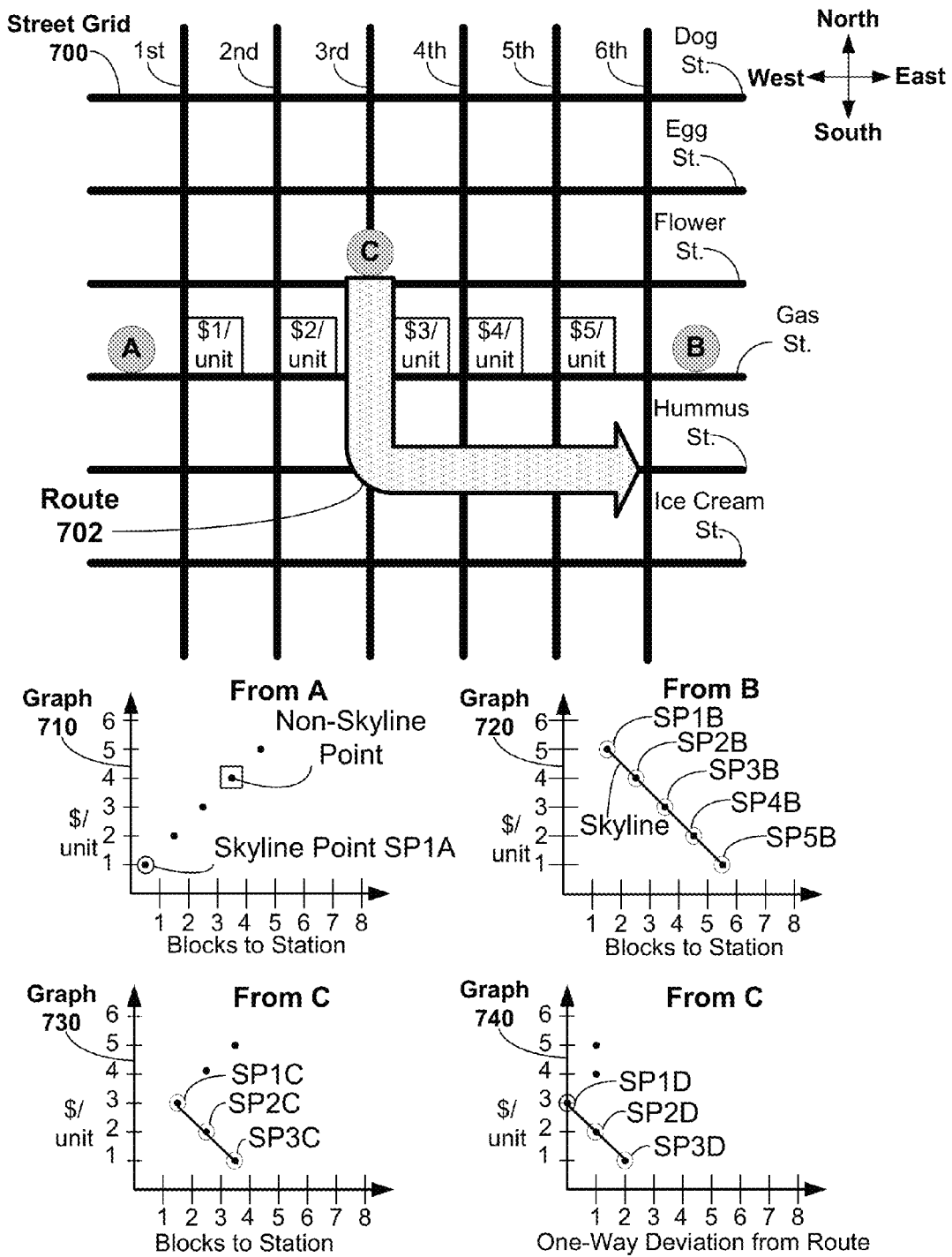
FIG. 7 is a diagram of an example street grid with points of interest and corresponding skyline graphs.

FIG. 7 shows an example street grid 700 with 1st through $6^{th}$ Streets running north-south, with $1^{st}$ Street being furthest west and $6^{th}$ Street being furthest east. Street grid 700 also has six streets running east-west: Dog St. (furthest north), Egg St., Flower St., Gas St., Hummus St., and Ice Cream St. (furthest south).

All of the gas stations in street grid 700 are located on Gas St. FIG. 7 shows a gas station with a price of $1/unit of gasoline at the corner of Gas and $1^{st}$ Streets, a gas station with a price of $2/unit of gasoline at the corner of Gas and $2^{st}$ Streets, and so on until reaching a gas station with a price of $5/unit of gasoline at Gas and $5^{th}$ Streets.

FIG. 7 shows three starting points on street grid 700: (1) point A, which is on Gas St. about one-half block west of $1^{st}$ Street, (2) point B, which is on Gas St. about one-half block east of $6^{th}$ Street, and (3) point C, which is about one-half block north of the intersection between Flower and $3^{rd}$ Streets.

FIG. 7 shows a graph 710 of gasoline price (in $/unit) versus distance (in blocks) from point A. As point A is within one block of a gas station located at Gas and $1^{st}$ Streets, which is the cheapest gas station on street grid 700, a point representing the gas station located at Gas and $1^{st}$ Streets on graph 710 is a skyline point as it cannot be dominated by another point both in terms of distance and price. This point is shown as circled on graph 710 and labeled as skyline point (SP) 1A in FIG. 7. The remaining points in graph 710 represent both higher gasoline prices and longer distances from point A than skyline point SP1A. Therefore, the remaining points are dominated by skyline point SP1A. For example, graph 710 shows one non-skyline point surrounded by a square that represents the gas station at Gas and $4^{th}$ Streets, which is about 3.5 blocks from point A and has a price of $4/unit of gasoline.

Graph 720 is a graph of gasoline price (in $/unit) versus distance (in blocks) from point B, which is at Gas and $6^{th}$ Streets. The closest gas station to point B is about 1.5 blocks away from point B, charges $5/unit of gasoline, and is represented on graph 720 as skyline point SP1B. As skyline point SP1B represents the closest gas station to point B, SP1B is a skyline point as it cannot be dominated by any other point. FIG. 7 shows that, by traveling west on Gas St. from point B, successively cheaper gas stations are reached at $4^{th}$ Street, which is represented by skyline point SP2B in graph 720, $3^{rd}$ Street as represented by skyline point SP3B in graph 720, $2^{nd}$ Street as represented by skyline point SP4B in graph 720, and $1^{st}$ Street as represented by skyline point SP5B in graph 720. That is, each successive gas station represents a point that cannot be dominated by another point. Graph 720 also shows a "skyline" or line connecting each of the skyline points in the graph 720.

Graph 730 is a graph of gasoline price (in $/unit) versus distance (in blocks) from point C, which is just north of Flower and $3^{rd}$ Streets. Point C is about 1.5 blocks away from the closest gas station on Gas and $3^{rd}$ Streets, about 2.5 blocks away from either the gas station on Gas and $2^{nd}$ Streets or the gas station on Gas and $4^{nd}$ Streets, and about 3.5 blocks away from either the gas station on Gas and $1^{st}$ Streets or the gas station on Gas and $5^{th}$ Streets, as can be seen in graph 730.

Skyline point SP1C of graph 730 represents the closest gas station on Gas and $3^{rd}$ Streets with a price of $3/unit. As skyline point SP1C represents the closest point to point C it cannot be dominated by another point. Skyline point SP2C dominates the equidistant gas station on Gas and $4^{nd}$ Streets based on the lower $2/unit price of gas at the station on Gas and $2^{nd}$ Streets compared to the $4/unit price on Gas and $4^{th}$ Streets. Similarly, skyline point SP3C dominates the equidistant $5/unit gas station on Gas and $5^{th}$ Streets based on the relative price of gas at the two stations.

Graph 740 is a graph of gasoline price (in $/unit) versus one-way deviation (in blocks) from route 702. The dominant points and skyline of graph 740 are similar to graph 730 with the prices remaining the same between the two graphs. Rather, the primary difference is that graph 740 has a leftward shift for all points in the graph compared to graph 730, due to the different distance metrics used in the two graphs.

The one-way deviation from the route can be determined by taking a distance from a closest point on the route to a point of interest off the route. For example, the closest point on route 702 to the gas station on Gas and $2^{nd}$ Streets is the intersection of Gas and $3^{rd}$ Streets. If route 702 was diverted to Gas and $2^{nd}$ Streets, it would be a two-block diversion: one block going west along Gas Street to the gas station at Gas and $2^{nd}$ Street, and one block going east along Gas Street to return to the closest point at Gas and $3^{rd}$ Streets. Thus, the "one-way" deviation in this example is one block and the "two-way" or "round-trip" deviation is two blocks.

Graph 740 shows that that the one-way deviation to the gas station at Gas and $3^{rd}$ Streets is zero blocks, since that gas station is on route 702. The one-way deviations to the stations at Gas and $2^{nd}$ Streets, Gas and $4^{th}$ Streets, and Gas and $5^{th}$ Streets are each one block, since the Gas and $2^{nd}$ Streets station is one block from the closest point of the route at Gas and $3^{rd}$ Street. The Gas and $4^{th}$ Streets station is one block from two points—Gas and $3^{rd}$ Street and Hummus and $4^{th}$ Street—along route 702, and the Gas and $5^{th}$ Streets station is one block from the closest point at Hummus and $5^{th}$ Streets. Additionally, the one-way deviation to the station at Gas and $1^{st}$ is two blocks from the closest point on route 702 at Gas and $3^{rd}$ Street.

Deviation could also be determined in other fashions. For example, suppose a route from A to B has a diversion to a point C and then the route is to continue on to B. Then, let $D_{AB}$ be the distance from A to B, $DA_C$ be the distance from A to C, and $D_{CB}$ be the distance from C to B. Then, the deviation to point C, or $DV_C$, can be determined as the total distance to deviate from the AB route to visit point C less the distance for the direct AB route, or $DV_C = D_{AC} + D_{CB} - D_{AB}$.

Figure 8A:
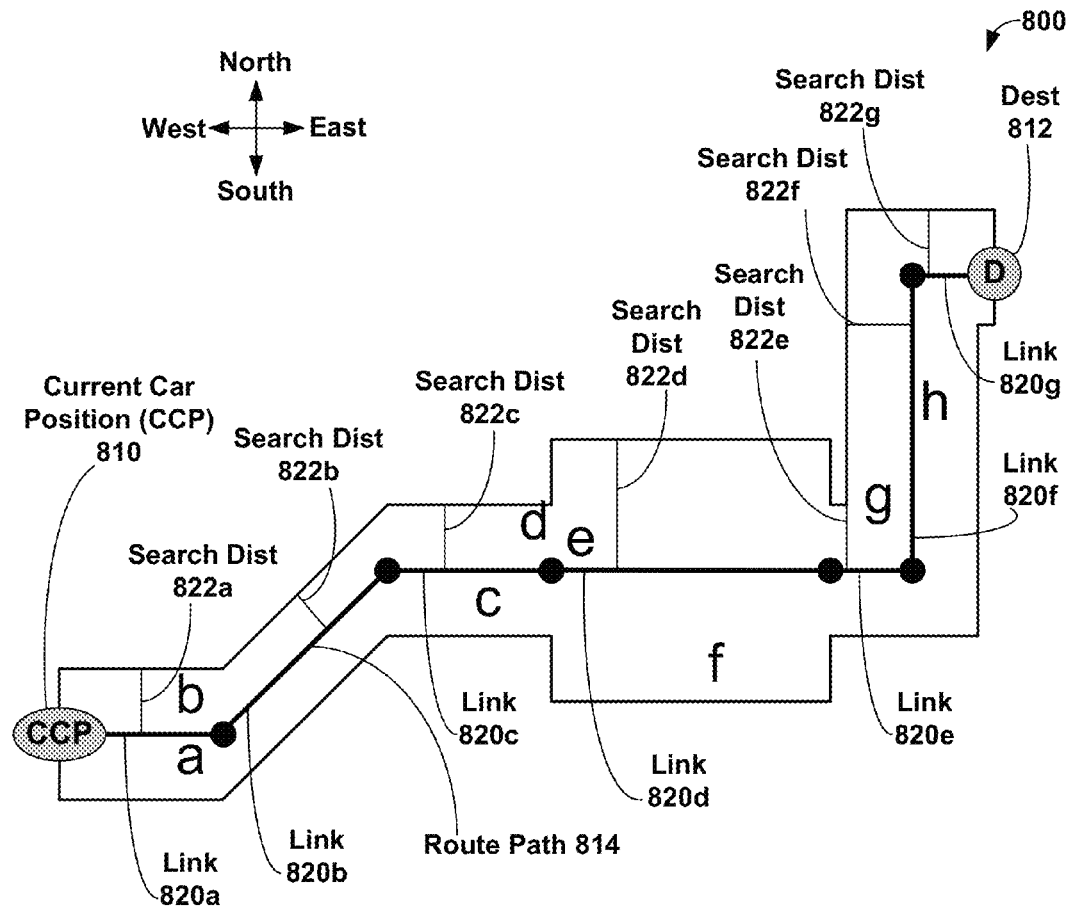
FIGS. 8A, 8B, and 8C depict a scenario with an example route path from a current car position to a destination with points of interest along the route path.
Figure 8B:
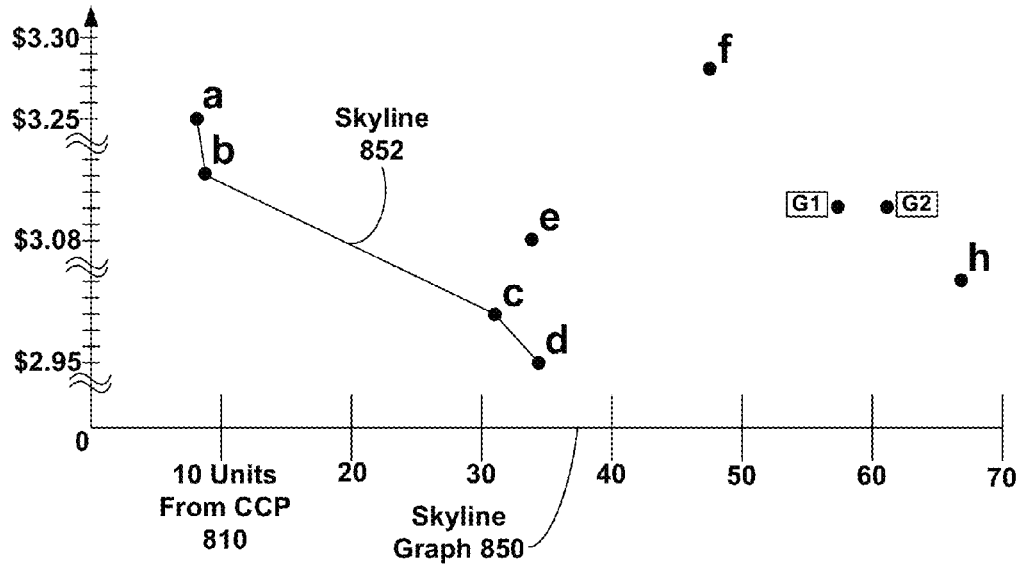
Figure 8C:
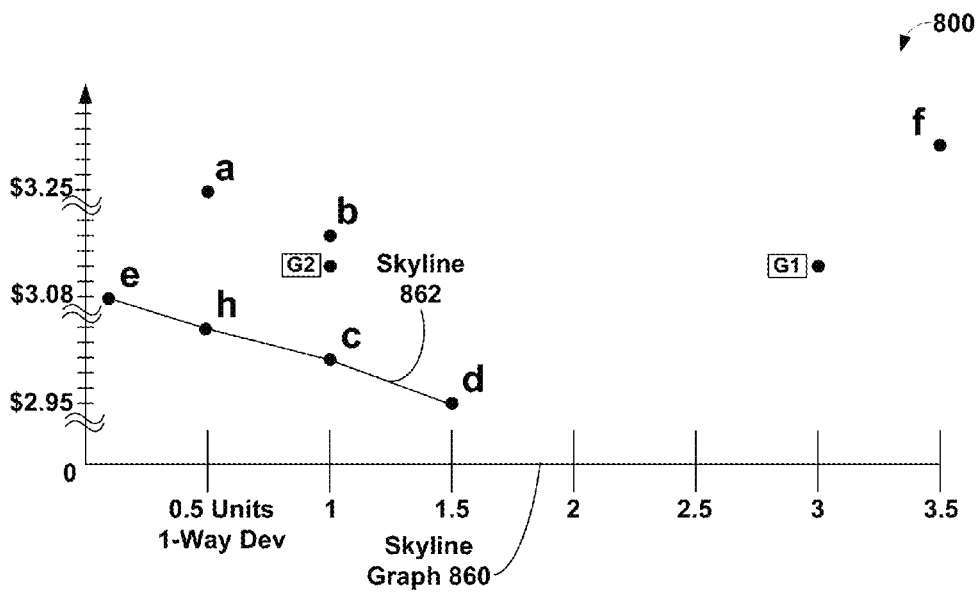
Figure 8C:
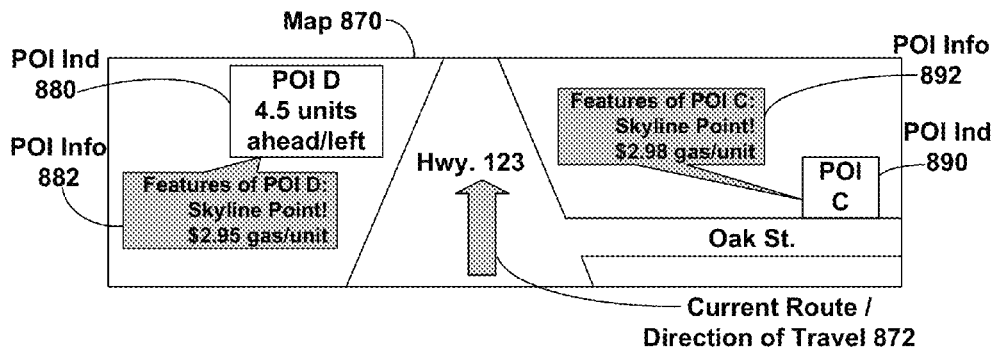

FIGS. 8A, 8B, and 8C together depict a scenario 800. FIG. 8A shows an example route path 814 from a current car position CCP 810 to a destination D 812 with points of interest, shown as boxes A, B, C, D, E, F, G, and H, along route path 814. In scenario 800, the points of interest are gas stations, each with an associated price for one gasoline unit (e.g., gallon, liter, Imperial gallon, etc.).

Route path 814 is made up of links 820a-820g. FIG. 8A shows link 820a beginning at CCP 810 and ends with a node (black dot) connected to link 820b, links 820b-820g each begin and end with a node (black dot) that represents an endpoint of the link, and link 820h begins with a node (black dot) shared with link 820f and ends with destination 812.

A point of interest (POI) search distance can be associated with each link. The POI search distance may be a Euclidean distance perpendicular to the link. The POI search distance may also be the network distance found by a routing algorithm, for example, the routing algorithm that calculated the route path 814. In one example, the POI search distance is less than the network distance stored in the relation Link2POI (LinkID, POIID, Distance) or variations of this relation described herein.

For example, FIG. 8A shows POI search distances 822a-822g each associated with a corresponding link 820a-820g and lines above and below the corresponding link indicate a search space within the POI search distance for each link. POI search distances can differ from link to link or remain the same. For examples, POI search distances 822a and 822b are equal, but POI search distance 822c for link 820c differs from POI search distance 822d for link 820d.

For at least some links, points of interest can be found within the POI search distance of the link. For example, points of interest A and B are within POI search distance 822a of link 820a. Other links, such as links 820b and 820g, may not have any points of interest within the POI search distance of the link.

Various attributes can be associated with each point of interest. Table 2 shows example attributes for the points of interest depicted in FIG. 8A:

TABLE 2

| POI | CCP Distance | Deviation | Price |
|-----|--------------|-----------|-------|
| A   | 8            | 0.5       | 3.25  |
| B   | 8            | 1         | 3.12  |
| C   | 30           | 1         | 2.98  |
| D   | 33           | 1.5       | 2.95  |
| E   | 34.1         | 0.1       | 3.08  |
| F   | 44           | 3.5       | 3.28  |
| G1  | 54           | 3         | 3.10  |
| G2  | 60           | 1         | 3.10  |
| H   | 66           | 0.5       | 3.00  |

A copy of Table 2 is reproduced on FIG. 8A for the reader's convenience.

Point of interest G is found twice along route path 814: first in searching along link 820e, with a deviation of 3 units, and second in searching along link 820f with a deviation of 1 unit. Consequently, Table 2 includes two tuples of data for point of interest G: a G1 entry for point of interest along link 820e, and a G2 entry for point of interest along 820f. In other examples not depicted in the Figures, only one tuple per unique point of interest is inserted into Table 2.

The route distance and the one-way deviation can be measured in "units"; e.g., miles or kilometers. The route distance can be a distance from current car position 810 to a nearest point on route path 814 to the point of interest. The one-way deviation can be a distance from route path 814 to the point of interest. Then, the one-way distance from current car position 810 to a point of interest can be calculated as the sum of the route distance and the one-way deviation. For example, point of interest C is 30 units from current car position 810 along route path 814 plus one unit of deviation from route path 814 for a total of 31 units between current car position 810 and point of interest C.

The data in Table 2 for points of interest along route path 814 can be determined using the Link2POI(LinkID, POIID, Distance) relation discussed above. For example, the SQL statement in Table 3 below creates a view named "Table2" including attributes POIID, CCPDistance, Deviation, and Price that can correspond to data shown above in Table 2.

TABLE 3

CREATE VIEW Table2 AS
SELECT POIID, DistFromCCP(routepath, LinkCCP, LinkID, POIDistance) as CCPDistance, Distance as Deviation, Price FROM Link2POI WHERE LinkID in (SELECT LinkID from routepath)

In this example SQL statement, the Link2POI relation is assumed to store a POIID or point of interest identifier for each point of interest, as well as a one-way deviation value named as a Distance attribute and a Price attribute for each point of interest. These attributes are SELECTed from the Link2POI relation for each point of interest for each link on the route path; e.g., for Link2POI tuples retrieved that satisfy the WHERE LinkID in (SELECT LinkID from routepath) condition.

The CCPDistance attribute can be a calculated attribute. For example, in the SQL statement in Table 3 above, a stored procedure named DistFromCCP can sum the distances of all links along the route path routepath between a link on the route path associated with current car position LinkCCP and a current link LinkID. In some examples, DistFromCCP can calculate the distance by adding deviation as well. However, deviation is not added into either the "CCP Distance" values shown in Table 2 above or the "CCP Dist" data shown on FIG. 8A.

The POI search distances 822a-822f can be used either in an SQL statement or during compilation of the Link2POI relation to screen out all points of interest that are more than a respective point of interest distance from the associated link. For example, suppose that POI search distance 822c is two units. Then, in generating the Link2POI relation, only data for points of interest two units or less from link 820c can be stored. If data is stored with the Link2POI relation, for points of interest beyond two units from link 820c, then SQL statement(s) and/or other software can be used to screen the data.

FIG. 8B shows an example skyline graph 850 and table of skyline points 854 based on points of interest shown along route path 814 of FIG. 8A and the data of Table 2. Skyline graph 850 plots values for points of interest A-H with distance from current car position (CCP) 810 along a horizontal axis and price along a vertical axis. For skyline graph 850, the distance from current car position 810 is the sum of the CCP distance and deviation values of Table 2; e.g., the distance to point of interest A depicted in graph 850 of FIG. 8B is 8 units from the current car position route path 814 plus 0.5 units deviation to equal a distance of 8.5 units.

Starting with the left side of skyline graph 850, point of interest A can be seen as a point of interest closest to current car position 810. Thus, point of interest A cannot be dominated by another point of interest. Moving to the right of point of interest A along skyline graph 850, point of interest B is shown as further from current car position 810 than point of interest A, but the price of $3.12 at point of interest B is lower than the $3.25 price at point of interest A. Therefore, based on price, point of interest B is also a skyline point on skyline graph 850. Similarly, skyline graph 850 shows points of interest C and D are progressively further from current car position 810 and also have progressively lower gasoline prices. Therefore, based on price, points of interest C and D are also skyline points of skyline graph 850.

Point of interest E is both further from current car position 810 and has a higher price of $3.10 than the $2.98 price at point of interest C and, thus, point of interest E is dominated by point of interest C. Similarly, point of interest D dominates points of interest F, G1, G2, and H. Accordingly, points of interest E, F, G1, G2, and H are not part of the skyline 852.

FIG. 8B shows skyline 852 connecting skyline points A, B, C, and D and table 854 with data for skyline points A, B, C, and D. Table 854 uses the term "CCP Dist+Dev" to indicate a distance calculated as the sum of the CCP distance (CCP Dist) and deviation (Dev).

A skyline query can be used to generate the data for skyline graph 850 and/or table 854. As shown in Table 3 above, a view Table 2 can be created with POIID, CCPDistance, Deviation, and Price attributes using the Link2POI relation. Then, the pseudo-SQL query shown in Table 4 below can use the Table 2 view of the Link2POI relation to generate the data shown in table 854:

TABLE 4

SELECT a. * FROM Table2 WHERE NOT EXISTS
(SELECT 1 FROM Table2 b WHERE (b.CCPDistance + b.Deviation) <
(a.CCPDistance + a.Deviation) AND b.Price < a.Price)

The pseudo-SQL statement of Table 4 selects as a variable "a", one or more tuples from the Table 2 view where, for each tuple in variable "a", there does not exist another tuple in the Table 2 view stored in a variable "b" such that the sum of the CCPDistance and Deviation values for "b" are less than the sum of the CCPDistance and Deviation values for "a" and the Price attribute value for tuple "b" is less than the price for tuple "a". The "a" records selected by the skyline query using the pseudo-SQL statement of Table 4 correspond to the points of interest of skyline 852 in skyline graph 850 and the skyline points shown in table 854.

As the Table 2 view data only includes data for points of interest within the POI distances along route path 814, the above pseudo-SQL statement of Table 4 operates on a fairly small data set of nine tuples. That is, use of the Link2POI relation in generating Table 2, leads to a concentrated data set of a relatively-small number of points of interest along a route path. This concentrated data set can be efficiently searched via the skyline query pseudo-SQL statement Table 4.

In other examples, the data in the Table 2 view can be provided to other skyline query algorithms, such as Block Nested Loop, Divide and Conquer, Branch-and-Bound, Shared Shortest Path, and Spatial skyline query algorithms, instead of or perhaps in addition to executing an SQL-based skyline query such as indicated by the pseudo-SQL of Table 4.

FIG. 8C shows an example skyline graph 860 and table of skyline points 864 based on points of interest shown along route path 814 of FIG. 8A and the data of Table 2. Skyline graph 860 plots values for points of interest A-H with one-way deviation from route path 814 along a horizontal axis and price along a vertical axis.

Starting with the left side of skyline graph 860 on FIG. 8C, point of interest E can be seen has having the minimum deviation from route path 814 and, thus, is a skyline point. Moving to the right, point of interest H is shown with a larger deviation than point of interest E, but the price of $3.00 is lower at point of interest H than the $3.08 price at point of interest E. Also, point of interest H has the lowest price for all points with a deviation equal to or less than the 0.5 units of deviation for point H. Therefore, point of interest H is a skyline point on skyline graph 860. Similarly, points of interest C and D require longer deviations from route path 814, but have lower prices of $2.98 and $2.95 respectively.

Skyline graph 860 shows that point of interest A has the same deviation of 0.5 units as point of interest H, but point of interest A has a higher price of $3.25 than the $3.00 price at point of interest H. Skyline graph 860 shows there are three points of interest with a deviation of 1 unit: B, C, and G2. Of these three points of interest, C has a price of $2.98, which is lower than the $3.12 price of B, and the $3.10 price of G1. Further, the $2.98 price at C is lower than the $3.00 price at dominant point H, and so point of interest C is a skyline point.

Additionally, skyline graph 860 shows that point of interest D has a longer deviation of 1.5 units than the 1.0 unit deviation to reach point of interest C, and point of interest D has the lowest price of $2.95 for all points of interest in Table 2. Thus, point of interest D is a skyline point of skyline graph 860.

FIG. 8C shows skyline 862 connecting skyline points E, H, C, and D and table 864 showing data for skyline points E, H, C, and D in tabular form. Table 864 uses the term "Dev" to indicate the one-way deviation (Dev) from route path 814.

A skyline query can be used to generate the data for graph 860 and/or table 864. The SQL query shown in Table 5 below can use the Table 2 view of the Link2POI relation to generate the data shown in table 864:

TABLE 5

SELECT a. * FROM Table2 WHERE NOT EXISTS
(SELECT 1 FROM Table2 b WHERE b.Deviation < a.Deviation AND
b.Price < a.Price)

The SQL statement of Table 5 can select as a variable "a", one or more tuples from the Table 2 view where, for each tuple in variable "a", there does not exist another tuple in the Table 2 view stored in a variable "b" such that the Deviation attribute value for tuple "b" is less than the Deviation attribute value for tuple "a" and the Price attribute value for tuple "b" is less than the price for tuple "a". The "a" records selected by the skyline query using the SQL statement of Table 5 correspond to the points of interest of skyline 862 in skyline graph 860 and the skyline points shown in table 864.

Figure 9:
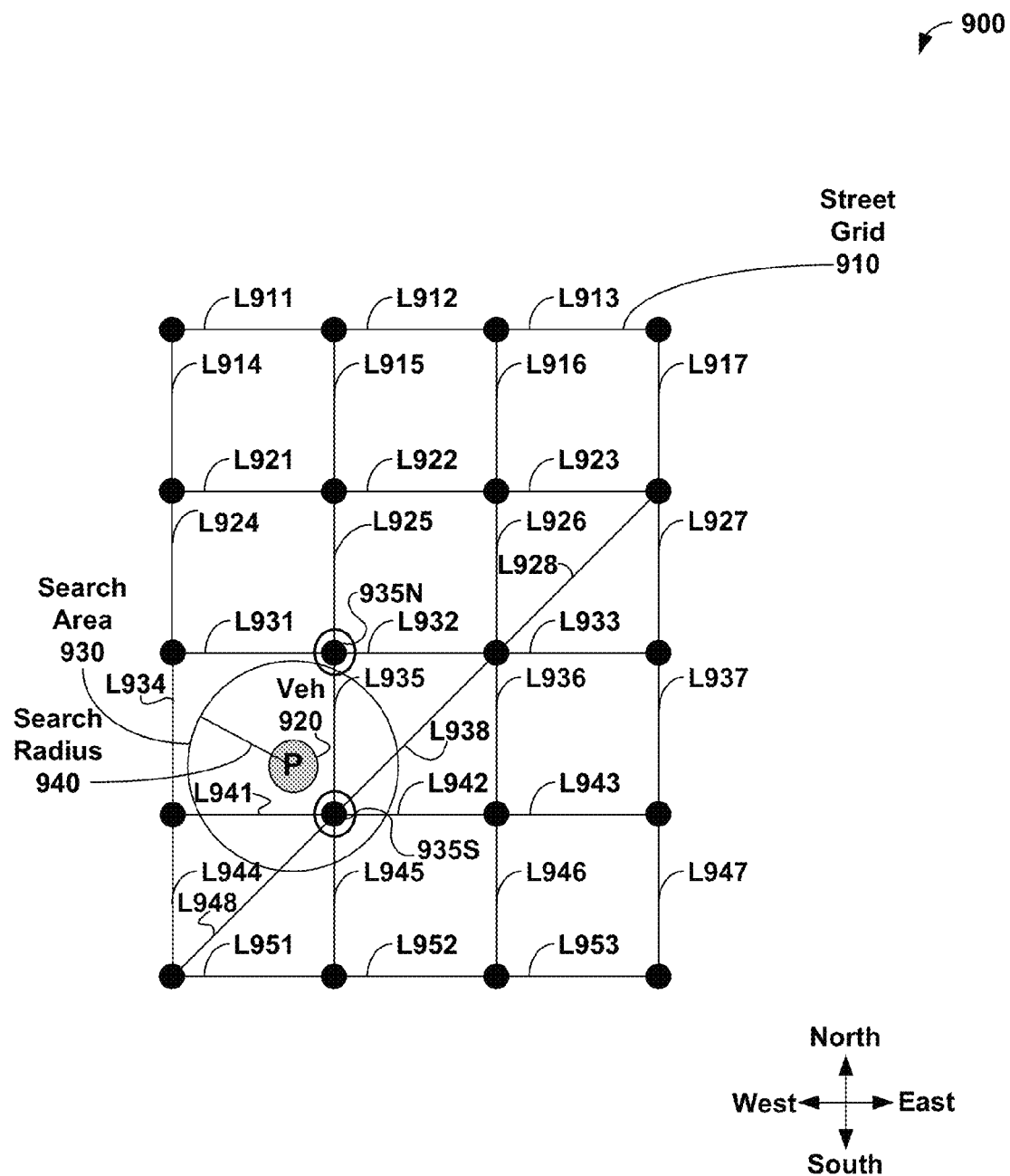
FIG. 9 depicts a scenario with a vehicle at a current position on a street grid.

FIG. 9 depicts a scenario 900 with a vehicle (Veh) 920 at a current position P on a street grid 910. During scenario 900, the vehicle at position P does not have a planned route.

Scenario 900 begins with a request for a skyline graph of points of interest for vehicle 920. As no route path is associated with vehicle 920, a nearby-link list NearbyLinkList of one or more links at or near vehicle 920 can be generated. Then, a skyline graph can be generated using the Link2POI relation for links on the associated link list. The skyline graph can include axes for a distance from vehicle 920 and price attributes. Data for the skyline graph can be retrieved using the example SQL statements shown in Table 6, which are similar to the SQL statements of Tables 2 and 3.

TABLE 6

// Create a NearbyLinkView view using the NearbyLinkList
// POIDistance can be predefined or otherwise determined
CREATE VIEW NearbyLinkView AS
SELECT POIID, DistFromCCP(NearbyLinkList, LinkCCP, LinkID,
POIDistance) as CCPDistance, Price FROM Link2POI
WHERE LinkID in (SELECT LinkID from NearbyLinkList)
// Generate Skyline Graph using NearbyLinkView for price and CCP TABLE 6-continued

```
Distance
SELECT a. * FROM NearbyLinkView WHERE NOT EXISTS
(SELECT 1 FROM NearbyLinkView b WHERE b.CCPDistance <
a.CCPDistance
AND b.Price < a.Price)
```

The two slashes "//" preceding a line of text indicate a line of comments for Table 6.

The nearby-link list can be generated by finding a "closest" link that is adjacent or closest to vehicle 920. As shown in FIG. 9, vehicle 920 is closest to link (L) 935 of street grid 910 so link 935 can be designated as the closest link. In some scenarios, a single closest link is sufficient for the nearby-link list, e.g., several points of interest can be retrieved for from the Link2POI relation for the closest link 935. A skyline graph can be generated using the points of interest associated with the closest link.

The nearby-link list can be "extended" by taking all links with a common endpoint to the closest link. Link 935 has two endpoints shown circled in FIG. 9: a northern endpoint 935N and a southern endpoint 935S. Northern endpoint 935N is common to link 935 and links 925, 931, and 932. Southern endpoint 935S is common to link 935 and links 938, 941, 942, 945, and 948. The resulting nearby-link list is {925, 931, 932, 935, 938, 941, 942, 945, 948}.

This procedure for extending the nearby-link list can include multiple "extensions." That is, let the first extension be the set of links that each share a common endpoint with the closest link, and the resulting nearby-link list include the closest link and the links of the first extension. Then, let the second extension be the set of links that each share a common endpoint with a link in the nearby-link list after taking the first extension, and updating the nearby-link list to include the links of the second extension. The nearby-link list after the second extension is: {915, 921, 922, 924, 925, 926, 928, 931, 932, 933, 934, 935, 936, 938, 941, 942, 943, 944, 945, 948, 951, 952}. Additional extensions can be taken until enough points of interest are found to generate the requested skyline graph.

Another technique is to find all links within a search radius of the position of vehicle 920. As shown in FIG. 9, a search radius 940 can be determined and links within search area 930 can be used to generate the nearby-link list. Links 935, 938, 941, 942, 945, and 948 are within search area 930 as shown in FIG. 9, leading to a nearby-link list of {935, 938, 941, 942, 945, 948}.

Historical link lists traveled by vehicle 920 can be used as well. For example, suppose vehicle 920 had been traveling east on link 951, turned north onto link 945 and continued to travel to link 935 until reaching the current position shown in FIG. 9. As vehicle 920 is on link 935, link 935 can be used to initialize a nearby-link list. Then, a historical link list of {951, 945, 935} can be used to estimate a direction of travel for vehicle 920. Based on this historical link list, vehicle 920 can be estimated to be moving in a direction between north and north-east. Then, the nearby-link list can be updated to add one more next-traveled links in the direction of travel. Using the street grid 910 shown in FIG. 9, next-traveled links can include links headed north or north-east from northern endpoint 935N of link 935; e.g., link 925 and perhaps link 932. Then, link 925 and perhaps link 932 can be added to the nearby-link list. The resulting nearby-link list is either {925, 935} or, if link 932 is added, {925, 932, 935}.

In some cases, a speed of a moving vehicle can be determined. Then, the speed can be used to aid determination of a number of extensions or size of a search radius to be used in adding links to a nearby-link list. For example, suppose that as vehicle speed increases, the nearby-link list may need to add links to be searched for points of interest. The minimum number of links can be determined via a look up table or formula; e.g., $NL = k_1 S + k_2$, where NL is number of links in the nearby-link list, $k_1$ and $k_2$ are constants, and S is the speed of the moving vehicle. $k_1$ and $k_2$ can be adjusted based on the units used for S; e.g., km/hr, MPH, m/s, etc. If the nearby-link list has fewer than the determined minimum number of links, more links can be added, e.g., by adding an extension of the nearby-link list, adding links found within an increased search radius, and/or by use of other techniques.

These techniques for generating nearby-link lists can be combined as well. For example, in the case where vehicle 920 is moving, a historical list of links can be used to determine a nearby-link list. Then, one or more extensions of the nearby-link list can be used to add links to the nearby-link list. Similarly, extensions of links within a search radius can be taken to add links to the nearby-link list. As another example, suppose a nearby-link list is generated using a historical link list and a direction of travel. Then, a search area can be determined for each link on the nearby-link list, and links within the search area(s) can be added to the nearby-link list. Other combinations are possible as well.

Figure 10:
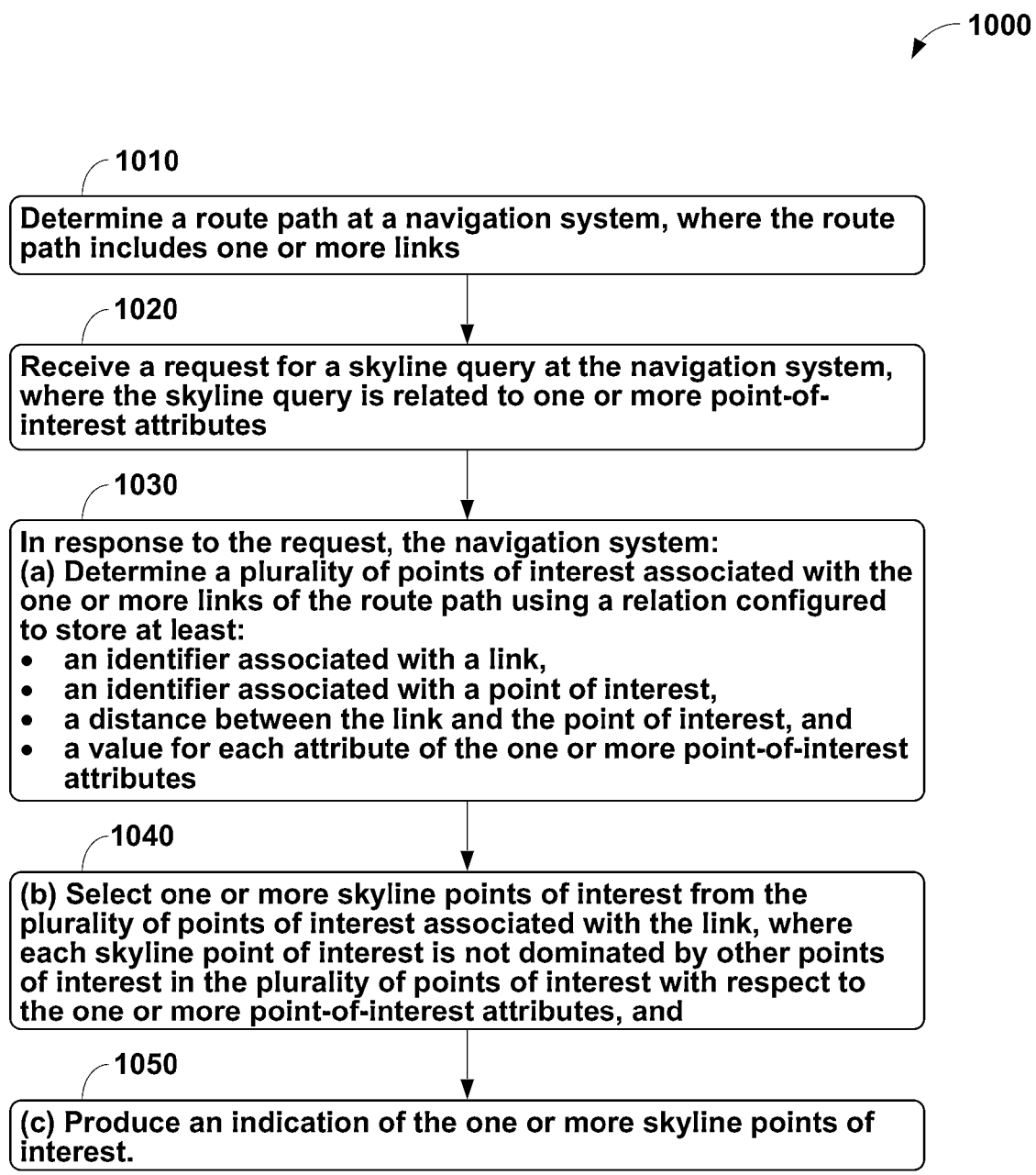
FIG. 10 is a flow diagram of a method for performing skyline queries, according to an example.

FIG. 10 is a flow diagram of a method 1000 for performing skyline queries. Method 1000 can be implemented using a computer, such as computing platform 500, perhaps configured as a navigation system. The techniques of method 1000 are discussed above in the context of at least FIGS. 7-9. Method 1000 begins at block 1010, where a navigation system determines a route path. The route path can have one or more links.

At block 1020, the navigation system can receive a request for a skyline query. The skyline query can be related to one or more point-of-interest attributes. In one example, the point-of-interest attributes can include a distance or time to travel from the current position. In other examples, the point-of-interest attributes can include a price. In still other examples, the point-of-interest attributes can include a distance from the route path or time to travel to the route path. Other point-of-interest attributes may also be used, such as POI category, hours of operation, and so on.

At block 1030, in response to the request, the navigation system can determine a plurality of points of interest associated with the one or more links of the route path. The plurality of points can be determined using a relation configured to store at least: an identifier associated with a link, an identifier associated with a point of interest, a distance between the link and the point of interest, and a value for each attribute of the one or more point-of-interest attributes.

At block 1040, the navigation system can select one or more skyline points of interest from the plurality of points of interest associated with the link. Each skyline point of interest is not dominated by any of the other points of interest in the plurality of points of interest with respect to the one or more point-of-interest attributes.

In some examples, selecting the one or more skyline points of interest can include performing a database query configured to determine whether a point of interest in the plurality of points of interest is not dominated by any of the other points of interest. In other examples, selecting the one or more skyline points of interest can include selecting the one or more skyline points of interest using a skyline-query algorithm.

At block 1050, the navigation system can produce an indication of the skyline points of interest. In some examples, the indication can include a map depicting at least one skyline point of interest. In other examples, the indication can include a list that includes at least one displayed skyline point of interest, where the at least one displayed skyline point of interest is selected from the at least one skyline point of interest. In still other examples, the indication can include a list that has at least one skyline point of interest and at least one point-of-interest attribute for the at least one skyline point of interest.

FIG. 11 is a flow diagram of a method 1100 for performing skyline queries. Method 1100 can be implemented using a computer, such as computing platform 500, perhaps configured as a navigation system. The techniques of method 1100 are discussed above in the context of at least FIGS. 7-9. Method 1100 begins at block 1110, where a navigation system determines a current position.

At block 1120, the navigation system can receive a request for a skyline query. The skyline query can be related to one or more point-of-interest attributes. In some examples, the point-of-interest attributes can include a distance or a travel time from the link related to the current position. Other point-of-interest attributes include price, category, hours of operation, and so on.

At block 1130, in response to the request, the navigation system can determine a plurality of points of interest associated with the current position. The plurality of points can be determined using a relation configured to store at least: an identifier associated with a link related to the current position, an identifier associated with a point of interest, a distance between the link related to the current position and the point of interest, and a value for each attribute of the one or more point-of-interest attributes.

In some examples, the link related to the current position can include a link closest to the current position. In particular examples, the link related to the current position can also include one or more links that share a common endpoint with to the link closest to the current position. In other examples, the link related to the current position can include one or more links within a search radius of the current position.

In still other examples, a historical list of links associated with the current position can be determined. A direction of travel can be determined based on the historical list of links. At least one next-traveled link can be determined based on the direction of travel. Then, the link related to the current position can include the at least one next-traveled link.

At block 1140, the navigation system can select one or more skyline points of interest from the plurality of points of interest associated with the link related to the current position. Each skyline point of interest is not dominated by other points of interest in the plurality of points of interest with respect to the one or more point-of-interest attributes.

In some examples, selecting the one or more skyline points of interest can include performing a database query configured to determine whether a point of interest in the plurality of points of interest is not dominated by the other points of interest.

At block 1150, the navigation system can produce an indication of the skyline points of interest. In some examples, the indication can include a map depicting at least one skyline point of interest. In other examples, the indication can include a list that includes at least one indicated skyline point of interest, where the at least one indicated skyline point of interest is selected from the at least one skyline point of interest. In still other examples, the indication can include a list that has at least one skyline point of interest and at least one point-of-interest attribute for the at least one skyline point of interest.

It is intended that the foregoing detailed description be regarded as illustrative rather than limiting and that it is understood that the following claims including all equivalents are intended to define the scope of the invention. The claims should not be read as limited to the described order or elements unless stated to that effect. While a standalone navigation system example was described in detail, the geographic database may be stored on a server and queried by a client device. For example, a client device such as a mobile telephone may send a route to a server and the server returns a list of points of interest to the client device. Therefore, all embodiments that come within the scope and spirit of the following claims and equivalents thereto are claimed as the invention.

We claim:

1. A computer-implemented method for determining skyline points of interest, comprising:
    determining a route path at a navigation system, wherein the route path comprises an initial link associated with an origin of the route path and one or more subsequent links that connect the origin of the route path with a destination of the route path;
    receiving a request for a skyline query at the navigation system, wherein the skyline query is related to one or more point of interest attributes;
    in response to the request, the navigation system:
        determining a plurality of points of interest associated with the one or more subsequent links of the route path using a relation configured to store at least a link identifier for a subsequent link, a point of interest identifier for a point of interest, a distance between the subsequent link and the point of interest, and a value for each attribute of the one or more point of interest attributes;
        selecting one or more skyline points of interest from the plurality of points of interest associated with one or more subsequent links of the route path, wherein a skyline point of interest is not dominated by other points of interest in the plurality of points of interest with respect to the one or more point of interest attributes; and
        producing an indication of the one or more skyline points of interest.

2. The computer-implemented method of claim 1, wherein selecting the one or more skyline points of interest comprises performing a database query configured to determine whether a point of interest in the plurality of points of interest is not dominated by other points of interest in the plurality of points of interest.

3. The computer-implemented method of claim 1, wherein selecting the one or more skyline points of interest comprises selecting the one or more skyline points of interest using a skyline-query algorithm.

4. The computer-implemented method of claim 1, wherein the one or more point of interest attributes comprise a distance from the current position.

5. The computer-implemented method of claim 1, wherein the one or more point of interest attributes comprise a price offered at the plurality of points of interest.

6. The computer-implemented method of claim 1, wherein the one or more point of interest attributes comprise a point of interest category.

7. The computer-implemented method of claim 1, wherein the one or more point of interest attributes comprise a distance from the route path to the point of interest.

8. The computer-implemented method of claim 1, wherein the indication comprises a map depicting at least one skyline point of interest or a list that includes at least one indicated skyline point of interest.

9. The computer-implemented method of claim 1, wherein the indication comprises a list that includes at least one skyline point of interest and at least one point of interest attribute for the at least one skyline point of interest.

10. The computer-implemented method of claim 1, wherein the relation is stored before the route path is determined and before the skyline query is received.

11. A computer-implemented method determining skyline points of interest, comprising:
    determining a current position at a navigation system;
    receiving a request for a skyline query at the navigation system, wherein the skyline query is related to one or more point of interest attributes;
    in response to the request, the navigation system:
        determining a plurality of points of interest associated with the current position using a relation configured to store at least a link identifier for a link related to the current position, a point of interest identifier for a point of interest, a distance between the link related to the current position and the point of interest, and a value for each attribute of the one or more point of interest attributes, wherein the relation is stored before the current position is determined;
        selecting one or more skyline points of interest from the plurality of points of interest, wherein each skyline point of interest is not dominated by other points of interest in the plurality of points of interest with respect to the one or more point of interest attributes; and
        producing an indication of the one or more skyline points of interest, wherein the indication comprises a map depicting at least one skyline point of interest.

12. The computer-implemented method of claim 11, wherein the link related to the current position comprises a link closest to the current position.

13. The computer-implemented method of claim 11, wherein the link related to the current position further comprises one or more links that share a common endpoint with a link closest to the current position.

14. The computer-implemented method of claim 11, wherein the link related to the current position comprises one or more links within a search radius of the current position.

15. The computer-implemented method of claim 11, wherein determining the plurality of points of interest associated with the current position using the relation configured to store at least the link identifier for the link related to the current position comprises:
    determining a historical list of links associated with the current position and past travel;
    determining a direction of travel based on the historical list of links;
    determining at least one next-traveled link based on the direction of travel; and
    determining that the link related the current position comprises the at least one next-traveled link.

16. The computer-implemented method of claim 11, wherein selecting the one or more skyline points of interest comprises performing a database query configured to determine whether a point of interest in the plurality of points of interest is not dominated by other points of interest in the plurality of points of interest.

17. The computer-implemented method of claim 11, wherein the display comprises a list that includes at least one indicated skyline point of interest.

18. The computer-implemented method of claim 11, wherein the indication comprises a list that includes at least one skyline point of interest and at least one point of interest attribute for the at least one skyline point of interest.

19. A navigation system, comprising:
    a processor,
    a geographic database that includes a relation that associates link identifiers, point of interest identifiers, distances between links and points of interest, and point of interest attribute values; and
    data storage containing instructions executable by the processor for carrying out skyline queries, including:
        identifying a plurality of points of interest relevant to a search request using the relation;
        limiting the plurality of points of interest based on a distance to a route path, the distance is selected as a function of a classification of at least a portion of the route path;
        selecting one or more skyline points of interest within the plurality of points of interest, wherein the skyline points of interest are not dominated by the other points of interest; and
        providing the selected skyline points of interest.

20. The navigation system of claim 19, wherein the classification includes data indicative of a controlled access road, an arterial road, or a local road.

\* \* \* \* \*